United States Patent
Li et al.

(10) Patent No.: US 6,838,544 B2
(45) Date of Patent: Jan. 4, 2005

(54) POLYOL POLYMERS, MESO-ERYTHRITOL POLYMERS AND THEIR ALIPHATIC ACID ESTERS AND ALIPHATIC ETHERS

(75) Inventors: Ge Li, Fukui (JP); Takahito Otani, Fukui (JP); Hiro mi Fujita, Fukui (JP); Hirokuni Tajima, Fukui (JP); Hitoshi Kawakami, Fukui (JP)

(73) Assignee: Rengo Co., Ltd., Osaka (JP)

( * ) Notice: Subject to any disclaimer, the term of this patent is extended or adjusted under 35 U.S.C. 154(b) by 174 days.

(21) Appl. No.: 10/162,643

(22) Filed: Jun. 6, 2002

(65) Prior Publication Data

US 2003/0017132 A1 Jan. 23, 2003

(30) Foreign Application Priority Data

| Jun. 6, 2001 | (JP) | ................................. 2001-171287 |
| Dec. 26, 2001 | (JP) | ................................. 2001-393751 |
| Dec. 26, 2001 | (JP) | ................................. 2001-393757 |

(51) Int. Cl.[7] .................... C08G 65/34; C08G 65/48
(52) U.S. Cl. ................................................. 528/425
(58) Field of Search ........................................ 528/425

(56) References Cited

U.S. PATENT DOCUMENTS

| 2,122,089 A | | 6/1938 | Conrad |
| 2,520,671 A | | 8/1950 | Witcoff et al. |
| 3,717,612 A | * | 2/1973 | Babayan ..................... 528/119 |
| 4,350,781 A | * | 9/1982 | Rasshofer et al. .......... 521/159 |
| 5,637,557 A | * | 6/1997 | Jahnke et al. ............... 507/246 |
| 5,731,476 A | | 3/1998 | Shawl et al. ................ 568/619 |

FOREIGN PATENT DOCUMENTS

| GB | 2040297 | | 8/1980 | |
| JP | 11269116 A | * | 10/1999 | ........... C07C/43/13 |
| NL | 82891 | * | 10/1956 | |

OTHER PUBLICATIONS

Chemical abstracts accession No. 149–32–6, meso–erythritol or erythritol, 1967.*

* cited by examiner

Primary Examiner—Robert Sellers
(74) Attorney, Agent, or Firm—Wenderoth, Lind & Ponack, L.L.P.

(57) ABSTRACT

A polyol polymer having a greater number of hydroxy groups, an aliphatic acid ester of a polyol polymer having a greater number of hydroxy groups, and an aliphatic ether of a polyol polymer having a greater number of hydroxy groups are provided. A polymer obtained by polymerizing a polyol containing meso-erythritol, and an aliphatic acid ester and an aliphatic ether of the polymer are provided.

3 Claims, No Drawings

POLYOL POLYMERS, MESO-ERYTHRITOL POLYMERS AND THEIR ALIPHATIC ACID ESTERS AND ALIPHATIC ETHERS

BACKGROUND OF THE INVENTION

This invention relates to polyol polymers, aliphatic acid esters of the polyol polymer, aliphatic ethers of the polyol polymer, and a method of preparing the same.

As a polyol polymer having a great number of hydroxy groups, polyglycerol is known. Polyglycerol is used as materials for surfactants, etc.

But if the aliphatic acid ester obtained from polyglycerol is used as a material, it has insufficient hydrophilicity for some applications. In order to improve hydrophilicity, trials have been made to add a hydrophilic functional group such as sulfonic group. But surfactants having such a functional group are liable to irritate the skin.

An object of this invention is to provide a polyol polymer having a greater number of hydroxy groups, an aliphatic acid ester of a polyol polymer having a greater number of hydroxy groups, and an aliphatic ether of a polyol polymer having a greater number of hydroxy groups.

SUMMARY OF THE INVENTION

According to the present invention, there are provided a polyol polymer of which the major component is a polymer having 2–16 polyol units, the polyol polymer being obtained by polymerizing polyols containing meso-erythritol, an aliphatic acid ester of a polyol polymer of which the major component is a polymer having 2–16 polyol units, the polyol polymer being obtained by polymerizing polyols containing meso-erythritol, or an aliphatic ether of a polyol polymer of which the major component is a polymer having 3–16 polyol units, the polyol polymer being obtained by polymerizing polyols containing meso-erythritol.

Meso-erythritol has a greater number of hydroxy groups by one than glycerol. Thus the polyol polymer obtained from meso-erythritol has a greater number of hydroxy groups than polyglycerol and should be more hydrophilic. Thus, if the polyol polymer, an aliphatic acid ester of the polyol polymer or an aliphatic ether of the polyol polymer is used as a surfactant or its raw material, the hydrophilicity of the surfactant obtained will be improved further.

DETAILED DESCRIPTION OF THE PREFERRED EMBODIMENT

Hereinbelow, embodiments of this invention will be described.

The polyol polymer according to this invention has as its major component a polymer having 2–16 polyol units and is formed by polymerizing polyols containing meso-erythritol as the monomers.

The aliphatic acid ester of a polyol polymer according to this invention is obtained by esterifying a polyol polymer having 2–16 polyol units, the polyol polymer being formed by polymerizing polyols containing meso-erythritol as the monomers.

The aliphatic ether of a polyol polymer according to this invention is obtained by etherifying a polyol polymer having 3–16 polyol units, the polyol polymer being formed by polymerizing polyols containing meso-erythritol as the monomers.

The polyol used therein is a compound having two or more hydroxy groups, and includes ethylene glycol, glycerol, erythritol, threitol, lyxitol, ribitol, xylitol, sorbitol, etc.

Among them, polyols containing erythritol, particularly meso-erythritol, are preferable. It is preferable that 50 mol % or more of the constituent monomer is meso-erythritol. By using such a polyol, the polyol polymer obtained contains a greater number of hydroxy groups. In particular, if the polyol is made up of meso-erythritol only, the polyol polymer obtained is referred to as "polyerythritol".

For polyol and meso-erythritol as raw materials, not only high-purity products subjected to one or a combination of treatments such as removal of microorganisms, decolorization, desalting, chromatography and/or recrystallization, etc. after synthesis or fermentation, but also crude products can be used according to the intended application. For example, if several percents of other polyols are contained in meso-erythritol that has been subjected to only removal of microorganisms after fermentation, a polyol polymer having a meso-erythritol content of 90–99% will be obtained by polymerizing such a meso-erythritol.

Hereinbelow, meso-erythritol will be simply referred to as "erythritol".

The degree of polymerization of the major component of the polyol polymer should be 2–16, preferably 2–14, more preferably 2–8, and further preferably 3–6. A polyol polymer of which the major component is a polymer having 17 or more polyol units is not easy to obtain because the reaction conditions have to be severe and by-production of gel and serious coloring occur.

The degree of polymerization of the major component of the polyol polymer in the aliphatic acid ester of polyol polymer should be 2–16, preferably 2–14, more preferably 2–8, and further preferably 3–6. A polyol polymer of which the major component is a polymer having 17 or more polyol units is not easy to obtain because the reaction conditions have to be severe and by-production of gel and serious coloring occur.

The degree of polymerization of the major component of the polyol polymer in the aliphatic ether of polyol polymer should be 3–16, preferably 3–14, more preferably 3–8, and further preferably 3–6. A polyol polymer of which the major component is a polymer having 17 or more polyol units is not easy to obtain because the reaction conditions have to be severe and by-production of gel and serious coloring occur.

The polyol polymer according to this invention may be prepared by the method described below.

It may be prepared by polymerizing polyols containing erythritol in the presence of a catalyst at predetermined temperature and pressure. Since the polyol is in liquid state at the reaction temperature, it can be reacted in the absence of a solvent. As the catalyst, basic compounds are preferable. Among them, alkali metal compounds and alkaline earth metal compounds such as sodium hydroxide, potassium hydroxide, calcium hydroxide, sodium carbonate, potassium carbonate, calcium oxide and sodium hydride are preferable. Basic sodium compounds are further preferable.

The amount of the catalyst used in the reaction should be 0.005 to 10 wt % of the polyol containing erythritol, preferably 0.05 to 3 wt % in view of the reaction speed and from an economical viewpoint.

The reaction temperature should be selected according to the kind of the monomer used. If erythritol and one or more other polyol are used in combination, the reaction temperature is preferably 200–260° C. If only erythritol is used as the monomer, it is preferably 200–250° C., more preferably 210–240° C. If the reaction temperature is too high, coloring and formation of by-products would be remarkable. If it is too low, the polymerization reaction would be markedly slow.

Further, the reaction pressure should be selected according to the kind of monomer used. If erythritol and one or more other polyol are used in combination as the monomer, the reaction pressure is preferably 2–760 mmHg. If only erythritol is used as the monomer, it is preferably 10–760 mmHg. If it is desired to finish the reaction in a short time, it should be 10–400 mmHg, preferably 15–60 mmHg. Further, if it is desired to obtain a polymer with a higher yield while suppressing the formation of by-products and the evaporation of the monomer, it should be 400–760 mmHg, preferably 600–760 mmHg. Further, according to circumstances, these pressure conditions may be combined. For example, the pressure may be adjusted according to the monomer content at 400–760 mmHg at the initial stage of reaction and at 10–400 mmHg in the late stage of reaction.

The above reactions are preferably carried out by replacing the system with a gas which will not react with either the reactants or the products, or in such a gas flow. In particular, in the reaction under reduced pressure of 400–760 mmHg, in order to efficiently remove the water produced out of the system, it is preferable to carry out reaction in a gas flow. As gases that will not react with either the reactants or the products, inert gases such as nitrogen and helium, carbon dioxide, hydrogen, etc. can be cited. If such a gas is not used during the reaction, oxidation tends to occur and the final products would be severely colorized.

In order to prevent oxidation of both the monomer and product in the reaction, antioxidants, e.g. magnesium powder or phosphorus compounds such as hypophosphoric acid may be added.

As for the method of feeding erythritol, polyol, catalyst, etc., all of the materials may be fed together at once before reaction starts. Or, after the start of reaction, both the polyol monomer and the catalyst or one of them may be added in portions or continuously. The feeding method should be selected taking operability and productivity into consideration.

The polyol polymer thus obtained can be used as it is for some applications. But it is normally obtained in the form of a colorless viscous liquid by subjecting to decolorization with activated carbon and/or desalting with ion exchange resins. If necessary, unreacted polyol monomer(s) and/or low-molecular weight substances may be removed by distillation under high vacuum chromatographic treatment, or extraction with an organic solvent such as alcohol.

The polyol polymers, their aliphatic acid esters and aliphatic ethers according to this invention are sometimes used as a hydrophilic material for which is required water-retention ability, such as a humectant, plasticizer, moisture control agent, etc. If such applications are anticipated, superior water-retention ability is desired for the polyol polymer as the raw material for the aliphatic acid ester and aliphatic ether of polyol polymer according to this invention. For example, when the water content is measured after polyerythritol having the water content of 25% is let to stand for six days at the humidity of 20% and the temperature of 23° C., it has preferably a water content of 5% or over, more preferably 8% or over.

The thus obtained polyol polymers include not only linear oligomer chains, but also cyclic oligomer chains, branched oligomer chains, cyclic and branched oligomer chains.

Next, the aliphatic acid ester of polyol polymer according to this invention will be described.

By esterifying the polyol polymer thus obtained, an aliphatic acid ester of the polyol polymer is obtained. In particular, if only erythritol is used as the polyol, an aliphatic acid ester of polyerythritol is obtained. As the polyol polymer, besides products purified by decoloration, desalting, etc., unpurified ones may be used for esterification according to the application. The polyol polymer obtained directly after polymerization may be used.

As the esterification method, the polyol polymer may be esterified using an aliphatic acid in the presence of a catalyst. Also, it may be transesterified with an aliphatic acid ester. Also, the polyol polymer may be esterified using an aliphatic acid halide. The aliphatic acid ester of the polyol polymer may be prepared by these methods.

The kind of the aliphatic acid is not particularly limited. Linear or branched, saturated or unsaturated aliphatic acids having a carbon number of 6 to 24, and a hydroxy substituted aliphatic acid and its condensate may be used. The aliphatic acid may be used alone or in combination of two or more according to the object.

As such aliphatic acids, the following may be used: caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid, behenic acid, lignoceric acid, 2-ethyl hexanoic acid, 4-propyl pentanoic acid, 4-ethyl pentanoic acid, 2-methyl decanoic acid, 3-methyl decanoic acid, 5-propyl octanoic acid, 3-methyl undecanoic acid, 6-propyl nonanoic acid, 2-methyl dodecanoic acid, 2-methyl tridecanoic acid, 2-methyl tetradecanoic acid, 2-ethyl tetradecanoic acid, 15-methyl hexadecanoic acid, 2-ethyl hexadecanoic acid, 2-butyl tetradecanoic acid, 2-methyl octadecanoic acid, 3-methyl octadecanoic acid, 3-methyl nonadecanoic acid, 2-ethyl octadecanoic acid, 2-methyl eicosanoic acid, 2-propyl octadecanoic acid, 2-butyl octadecanoic acid, 2-methyl docosanoic acid, 2-methyl tricosanoic acid, 3-methyl tricosanoic acid, 2-hexyl octadecanoic acid, 2-butyl-5-methyl pentanoic acid, 2,3-dimethyl nonanoic acid, 4,4-dimethyl decanoic acid, 2-ethyl-3-methyl nonanoic acid, 2,2-dimethyl-4-ethyl octanoic acid, 2,3-dimethyl dodecanoic acid, 3,7,11-trimethyl dodecanoic acid, 2,2-dimethyl tetradecanoic acid, 3,3-dimethyl tetradecanoic acid, 2,2-dimethyl hexadecanoic acid, 2-octyl-3-methyl nonanoic acid, 2,4-dimethyl octadecanoic acid, 3,3-dimethyl octadecanoic acid, decenoic acid, undecenoic acid, 2-dodecenoic acid, 3-dodecenoic acid, 5-dodecenoic acid, 11-dodecenoic acid, 4-tetradecenoic acid, 5-tetradecenoic acid, 9-tetradecenoic acid, 2-hexadecenoic acid, 7-hexadecenoic acid, 9-hexadecenoic acid, 6-octadecenoic acid, oleic acid, elaidic acid, 11-octadecenoic acid, 9-eicosenoic acid, 11-eicosenoic acid, 13-docosenoic acid, 15-tetracosenoic acid, 2-methyl-2-heptenoic acid, 3-methyl-2-nonenoic acid, 5-methyl-2-undecenoic acid, 2-methyl-2-dodecenoic acid, 5-methyl-2-tridecenoic acid, 2-methyl-9-octadecenoic acid, 2-ethyl-9-octadecenoic acid, 2-propyl-9-octadecenoic acid, 2-methyl-2-eicosenoic acid, 5,9-dimethyl-2-decenoic acid, 2,5-dimethyl-2-heptadecenoic acid, 2,2-dimethyl-11-eicosenoic acid, 2-octyn oic acid, 2-nonynoic acid, 2-decynoic acid, 2-undecynoic acid, 6-dodecynoic acid, 8-tridecynoic acid, 7-hexadecynoic acid, 2-heptadecynoic acid, 5-octadecynoic acid, 6-octadecynoic acid, 9-nonadecynoic acid, 13-docosynoic acid, 21-tricosynoic acid, linoleic acid, linolenic acid, ricinoleic acid, and condensed-ricinoleic acid. Further, aliphatic acids obtained from tallow, corn oil, soya bean oil, palm oil, olive oil, cotton seed oil, peanut oil, and castor oil, and others having a carbon number of 6 to 24 as the main components may be used.

As the aliphatic acid ester, a methyl, ethyl or glycerine ester of the aliphatic acid, etc. can be cited.

As the aliphatic acid halide, an acid halide such as chloride or bromide of the aliphatic acid can be cited.

The molar ratio between the polyol polymer and the aliphatic acid raw material such as the aliphatic acid, aliphatic acid ester or aliphatic acid halide in the esterification reaction may be suitably selected according to the intended degree of esterification. For example, assuming that the intended degree of esterification is n, the polyol polymer:aliphatic acid raw material (in molar ratio) should be 1:0.5n to 1:1.5n, but in view of economical reasons such as unreacted raw material, it is preferably 1:0.8n to 1:1.1n. The upper limit of n is the number of hydroxy groups in the polyol polymer. For example, if polyerythritol having an average degree of polymerization of 4 is used, n is 10. Also, if a high content of a mono-substituted ester is needed, the molar ratio should be 1:1 to 10:1, preferably 1.2:1 to 5:1.

The esterification reaction using the aliphatic acid is preferably carried out without a solvent. The reaction temperature should be 120–250° C., preferably 150–240° C.

Also, as for the reaction in which esterification is done by transesterification with an aliphatic acid ester, if the reaction is done without a solvent, the reaction temperature should be 100–240° C., preferably 130–200° C. If the reaction is done in a solvent, the reaction temperature should be 50–180° C., preferably 80–130° C.

In the esterification reaction using an aliphatic acid halide, the use of a solvent is preferable. The reaction temperature should be from room temperature to 180° C., preferably 40 to 130° C.

The reaction pressure is not particularly limited, and the reaction may be done either under reduced pressure or in an atmospheric pressure system. It may also be done firstly in an atmospheric pressure system and then under reduced pressure. The reaction time should be 1 to 24 hours, preferably 1 to 16 hours, though depending upon the reaction method, reaction agent and scale of synthesis.

If a solvent is used in the esterification reaction, the solvent is preferably one which dissolves the polyol polymer and is inert to the reactants and the products. For example, the following may be used: N,N-dimethylformamide, dimethylsulfoxide, N,N-dimethylacetamide, N-methylpyrrolidone, N-acetylmorpholine, N-methylsuccimide, pyridine, N,N-dimethylbenzylamine, N-formylpyrrolidine. The amount of the reaction solvent should be 1 to 10 in weight ratio relative to the polyol polymer.

As the catalyst for the esterification reaction, an acid or a base known as a catalyst for the esterification reaction may be used. In view of side reactions, a basic compound is preferable. Examples thereof include N,N-dimethylbenzylamine, sodium methylate, potassium hydroxide, sodium hydroxide, sodium carbonate, potassium carbonate, lithium hydride, sodium hydride, calcium hydroxide, calcium oxide, trimethylbenzylammonium hydroxide, aliphatic acid sodium salt, aliphatic acid potassium salt.

The amount of the catalyst used in the reaction should be 0.001 to 20 wt % of the total amount of the reactants, preferably 0.01 to 10 wt %. If an aliphatic acid halide is used for the reaction, the reaction may take place without a catalyst. But it is preferable to add a base such as triethylamine, 4-dimethylaminopyridine and sodium hydroxide by 0.1 to 3, preferably 1 to 1.5 equivalent amount relative to the aliphatic acid halide.

If esterification is carried out with an unpurified polyol polymer, such as the one immediately after the polymerization reaction, the catalyst used for polymerization can be used as it is. Thus it is possible to carry out the esterification reaction by adding less amount of the catalyst or without adding the catalyst further.

The thus obtained reaction product of the aliphatic acid ester of the polyol polymer may be used as it is if no solvent is used. If a solvent is used, after the solvent has been evaporated, the reaction product may be used as a surfactant or its raw material. Further, it may be used after being purified by one or a combination of the following treatments: neutralization, decoloration, recrystallization, reprecipitation, extraction with a solvent, separation with an absorption column, fractionation of components with a single or mixed solvent, etc.

An unreacted polyol polymer and/or aliphatic acid salt may exist in the reaction product under some reaction conditions. According to the application, such a reaction product can be used. If purification is required, the aliphatic acid ester of the polyol polymer may be extracted from the unpurified product by use of a solvent in which the polyol polymer and/or the aliphatic acid salt is hardly soluble, such as methyl ethyl ketone, methyl isobutyl ketone, n-butanol, toluene and ethyl acetate. Or, the reaction product may be dissolved or suspended in an organic solvent such as alcohols (methanol, ethanol, 2-propanol, n-propanol, n-butanol, t-butanol, etc.), ketones (methyl ethyl ketone, methyl isobutyl ketone, acetone, etc.), acetonitorile, tetrahydrofuran, dioxane, toluene, ethyl acetate, etc. Then, water, inorganic salts, organic salts or an aqueous solution of these salts may be added to extract or remove by settling any unreacted polyol polymer and/or aliphatic acid salt. After this treatment, by evaporating the organic solvent, an aliphatic acid ester of a polyol polymer can be obtained.

For the aliphatic acid ester of the polyol polymer according to this invention, water solubility (hydrophilicity) of the compound and high acid resistance and salt resistance of the aqueous solution are required in the field of surfactants, particularly emulsifiers for food. For use in such fields, such properties are required for the aliphatic acid ester of the polyol polymer according to this invention. In such a case, the higher the water solubility, the better. For example, the permeability (at 650 nm) at 20° C. of 1 wt % aqueous solution (water suspension) of polyerythritol aliphatic acid ester is preferably 35–100%, more preferably 60–100%.

Also, the higher the acid resistance of the aqueous solution, the better. For example, if a 0.1 wt % aqueous solution of polyerythritol aliphatic acid ester is set at pH2, its permeability (at 650 nm) at 25° C. is preferably 20–100%, more preferably 35–100%.

Also, the higher the salt resistance of the aqueous solution, the better. For example, if 1 wt % salt is added to a 0.1 wt % aqueous solution of polyerythritol aliphatic acid ester, permeability (at 650 nm) at 25° C. is preferably 20–100%, more preferably 30–100%.

If the water solubility, acid resistance and salt resistance of the aliphatic acid ester of the polyol polymer are below the desired ranges under the above conditions, precipitation or flocculation will occur significantly. This is not preferable for practical use. Also, since the real concentration of ester in the solution decreases due to the precipitation or flocculation, the abilities to emulsify, foam, disperse and solubilize will deteriorate.

The higher the emulsifying ability of the aliphatic acid ester of the polyol polymer according to this invention, the better. Also, as described above, an aqueous solution of the aliphatic acid ester of the polyol polymer is high in the acid resistance and salt resistance and it serves to impart these functions for emulsification. For example, when 150 parts by weight of soybean oil was added dropwise to 100 parts by weight of a 5 wt % aqueous solution (suspension) of polyerythritol aliphatic acid ester agitated with a homomixer to prepare an emulsion and it was let to stand for seven days, the emulsion existed stably without separating into two layers. Even if it is used at a high salt concentration (containing 5 wt % salt), it gives stable emulsion.

Also, the aliphatic acid ester of the polyol polymer according to this invention has an antimicrobial activity. For example, in the case of the aliphatic acid ester of polyerythritol, mono-substituted products are preferable. Among them, ones having an aliphatic chain length of C2 to C24 are preferable, and ones of C6 to C18 are superior in antimicrobial activity.

The polyol polymer and its aliphatic acid ester according to this invention are superior in heat resistance. For example, if the polyerythritol and its aliphatic acid ester are subjected to thermogravimetry analysis at a programmed heating rate of 10° C./min in air, one having a weight loss at 200° C. of 20% or less is preferable and one of 10% or less is more preferable.

Next, description will be made of the aliphatic ether of the polyol polymer according to this invention.

By etherifying the polyol polymer obtained, an aliphatic ether of the polyol polymer is obtained. In particular, if only erythritol is used as the polyol, an aliphatic ether of polyerythritol is obtained. As the polyol polymer, besides products purified by decoloration and desalting, according to the object and use, it may be used without purifying or may be etherified immediately after polymerization reaction.

As the etherifying methods, there are a method in which to a polyol polymer of which the main component is erythritol or to polyerythritol, an epoxy compound is added in the presence of a catalyst, and a method in which the polyol polymer or polyerythritol is reacted with an aliphatic halide. By these methods, an aliphatic ether of a polyol polymer or an aliphatic ether of a polyerythritol is prepared. If an epoxy compound is used, an aliphatic ether of a polyol polymer having a hydroxy group originating from the epoxy group through ring-opening is obtained.

As the epoxy compound, a compound expressed by the following formula (1) may be used.

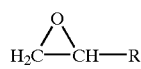 (1)

Also, as the aliphatic halide, a compound expressed by the following formula (2) may be used.

 (2)

In formulas (1) and (2), R represents linear or branched, saturated or unsaturated aliphatic chains or hydroxy substituted aliphatic chains. X in formula (2) represents a halogen atom. The compounds expressed by formula (1) and (2) may be used alone or in combination of two or more according to the object.

As specific examples of R, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl and docosyl can be cited. As specific examples of X, chlorine, bromine and iodine can be cited.

The molar ratio between the polyol polymer and the compound expressed by formula (1) or (2) in the etherification reaction may be suitably selected according to the intended degree of etherification. For example, assuming that the intended degree of etherification is n, the molar ratio of the polyol polymer:aliphatic raw material should be 1:0.5n to 1:1.5n and in view of economical reasons such as unreacted raw materials, it is preferably 1:0.8n to 1:1.1n. The upper limit of n is the number of hydroxy groups in the polyol polymer. For example, if polyerythritol having an average degree of polymerization of 4 is used, n is 10. Also, if a high content of a mono-substituted ether is needed, the molar ratio should be in the range of 1:1 to 10:1, preferably 1.2:1 to 5:1.

In the reaction using the compound expressed by formula (1), the reaction may be carried out in the absence of a solvent. But in view of viscosity of the reaction mixture, the reaction temperature and speed, it is preferable to add a solvent in which is dissolved the polyol polymer at the beginning of the reaction or at late stage. Importantly the solvent must not react with the compound expressed by formula (1) or other reactants. As such solvents, N,N-dimethylformamide, dimethylsulfoxide, N,N-dimethylacetamide, N-methylpyrrolidone, N-acetylmorpholine, N-methylsuccimide can be cited. On the other hand, if the compound expressed by formula (2) is used, the reaction may be carried out in the absence of a solvent. But in order to keep the reaction proceeding smoothly while reducing the viscosity and evaporating the water, a solvent may be used from the beginning of the reaction or from the late stage. As such solvents, N,N-dimethylformamide, dimethylsulfoxide, hexane, toluene, xylene, chloroform, tetrachloromethane, dioxane, tetrahydrofuran, N,N-dimethylacetamide can be cited.

The amount of reaction solvent is not particularly limited. But 1–10 in weight ratio relative to the polyol polymer will be suitable.

As catalysts used in the reaction using the compound expressed by formula (1), alkali metal compounds, alkaline earth metal compounds, tertiary amines, and quaternary amine compounds can be cited. Among them, alkoxides, hydroxides, carbonates, and hydrides of an alkali metal are preferable, but the catalyst should be selected according to the reaction method. As examples, sodium hydroxide, potassium hydroxide, lithium hydroxide, sodium methylate, sodium hydride, calcium hydroxide, calcium oxide, barium hydroxide, N,N-dimethylbenzylamine, triethylamine tetraethylammoniun hydroxide, trimethylbenzylammonium hydroxide, etc. can be cited. The amount of such a catalyst should be 0.01–20 wt % to the compound expressed by formula (1), preferably 0.05–10 wt %.

As catalysts used in the reaction using the compound expressed by formula (2), alkali metal compounds such as alkoxides, hydroxides, carbonates, etc. may be used, but should be selected according to the reaction method. Among them, in view of economic reason and handling, sodium hydroxide and potassium hydroxide are preferable. The amount of the catalyst is preferably 1 to 1.5 equivalent relative to the compound expressed by formula (2).

If etherification is carried out with an unpurified polyol polymer, such as the one immediately after the polymerization reaction, the catalyst used for polymerization can be used as it is. Thus it is possible to carry out the etherification reaction by adding less amount of the catalyst or without adding the catalyst further.

The temperature in the reaction using the compound expressed by formula (1) should be 50–200° C., preferably 80–160° C. Also, the temperature of the reaction using the compound expressed by formula (2) should be 50–200° C., preferably 60–120° C. In both of the cases of reactions, if the reaction temperature is below 50° C. the reaction speed will be too slow. At 200° C. or over, the product would be seriously colored. The reaction pressure is not particularly limited. Either a reduced pressure system or an atmospheric pressure system may be used. It is also possible to combine both pressure systems, namely, carry out the reaction firstly in the atmospheric pressure system and then in the reduced pressure system.

The reaction time should be 1–24 hours, preferably 1–8 hours, though depending upon the reaction method and the raw materials.

In both cases, if reaction is carried out with water contained in the reaction mixture, the yield may decrease and the compound expressed by formula (1) tends to turn into alkanediol and the compound expressed by formula (2) tends into an aliphatic alcohol. Thus, either the compound expressed by formula (1) or (2) should preferably be added to the polyol polymer after the water contained is removed.

The thus obtained reaction product which is an aliphatic ether of the polyol polymer may be used as it is as a surfactant or its raw material in case no solvent is used. If a solvent is used, it may be used after the solvent has been evaporated. Further, it may be used after purified by one or a combination of the following treatments: neutralization, decoloration, recrystallization, reprecipitation, extraction with a solvent, separation with an adsorption column, fractionation of components with a single or mixed solvent.

Unreacted polyol polymer may remain in the reaction product according to the reaction conditions. In such a case, the aliphatic ether of the polyol polymer may be extracted from the product by use of methyl ethyl ketone, methyl isobutyl ketone, n-butanol, toluene, ethyl acetate, etc. Or, the reaction product may be dissolved or suspended in an organic solvent such as alcohols (methanol, ethanol, 2-propanol, n-propanol, n-butanol or t-butanol, etc.), ketones (methyl ethyl ketone, methyl isobutyl ketone, acetone, etc.), acetonitorile, tetrahydrofuran, dioxane, toluene, ethyl acetate, etc., and water, inorganic salts, organic salts or an aqueous solution of these salts may be added to extract or remove any unreacted polyol polymer.

As a method of feeding raw materials and catalysts, in the esterification and etherification of the polyol polymer, all may be fed together at once before reaction starts. Or, after start of the reaction, one or a combination of the polyol polymer, aliphatic acid raw material or aliphatic raw material and catalyst may be added in portions or continuously. It should be selected taking into consideration the operability, productivity, etc.

Both the esterification and etherification of the polyol polymer are preferably carried out by replacing the system with a gas which will not react with either the reactants or the products, or in such a gas flow. In particular, in the reaction at weakly reduced degree of pressure to normal pressure, in order to efficiently remove the water produced out of the system, the reaction is preferably carried out in a gas flow. As such gases that will not react with either the reactants or the products, inert gases such as nitrogen and helium, carbon dioxide, hydrogen, etc. can be cited. If such a gas is not used during the reaction, oxidation tends to occur and the final products would be severely colorized.

The polyol polymer and its aliphatic acid ester and aliphatic ether can be used as surfactants, emulsifiers (for food, cosmetic and industrial), raw materials of cosmetics, detergents, antifoaming agents, dispersing agents, solubilizers, preservatives, crystallization controllers of oils and fats, foaming agents, dyeing auxiliaries, water-soluble ink, textile softening agents, plasticizers, antistatic agents, anticlouding agents, humectants, moisture control agents, lubricants, emulsifying auxiliaries, textile modifiers, sizing agents, surface finishing agents, caking agents, viscosity control agents, fire retardants, adhesives, antimicrobial agents, polymeric materials (polyurethane, epoxy resin, etc.), and their components or raw materials.

EXAMPLES

Hereinbelow, this invention will be described in more detail with reference to Examples.

<<Synthesis of Polyol Polymer>>

Example 1

Synthesis of Polyerythritol 100.0 g of meso-erythritol and 1.0 g of sodium hydroxide were reacted in a carbon dioxide atmosphere at 240° C. and 30–40 mmHg for two hours. 150 ml of water was added to the brown liquid obtained. The mixture was neutralized with diluted hydrochloric acid, decolorized with activated carbon, treated with a cation exchange resin (Mitsubishi Chemical Corporation; Daiaion SK-112) and an anion exchange resin (Mitsubishi Chemical Corporation; Daiaion WA30), and water was evaporated to obtain 69.3 g of colorless viscous liquid (water content: 5%).

When the product obtained was subjected to the TOF-MS analysis (LCT mass analyzer made by Micromass, ionization method: ESI, ions measured: positive ions), repeating units of 104 Da originating from meso-erythritol were observed. Also, as major peaks, besides peaks of chain polyerythritol oligomer from m/z 226 (degree of polymerization: 2) to m/z 1474 (degree of polymerization: 14), peaks of dehydrates that were smaller by 18 Da and 36Da than those of chain oligomer were also observed. The components were separated with the LC of the device (column: TSK-gel Amide-80 (Tosoh Corporation), eluent (acetonitrile/water: 80/20), 60° C., flow rate: 1 ml/min) and their molecular weights were measured. Linear and branched polyerythritols were observed. Calculating from the TOF-MS ion strength, the average degree of polymerization was 4.

The major peaks of the IR spectrum (KBr) were observed at 3391, 2929, 2884, 1652, 1456, 1418, 1325, 1257, 1082, and 890 cm$^{-1}$. The peaks of $^{13}$C-NMR spectrum ($D_2O$) were observed in the range of 83.8–62.8 ppm.

Example 2

Synthesis of Polyerythritol

Except that the reaction was for six hours at normal pressure (760 mmHg) in a nitrogen gas flow, and that a cation exchange resin (Mitsubishi Chemical Corporation: Diaion PK-212) and an anion exchange resin (Mitsubishi Chemical Corporation: Diaion PA-408) were used, the reaction and after-treatment were carried out in the same manner as in Example 1 to obtain 84.0 g of colorless viscous liquid (water content: 1%). In the TOF-MS analysis, besides the repeating units of 104Da and peaks of chain polyerythritol oligomer (dimer to decamer), peaks of dehydrates smaller by 18 Da than those of chain oligomer were observed. The average degree of polymerization was 3.

The major peaks of the IR spectrum (KBr) were at 3393, 2933, 2887, 1652, 1458, 1420, 1339, 1241, 1078, 888 cm$^{-1}$. The $^{13}$C-NMR spectrum ($D_2O$) showed peaks in the range of 83.6–62.7 ppm.

Example 3

Synthesis of Polyerythritol

Except that the amount of the catalyst was 0.2 g and the reaction time was 16 hours, the reaction was carried out in the same manner as in Example 2. After the reaction, 100 ml of water was added and the mixture was neutralized with diluted hydrochloric acid and decolorized with activated carbon, and water was evaporated. 85.2 g of colorless, viscous liquid was obtained.

The major peaks of the IR spectrum (KBr) were at 3391, 2930, 2882, 1653, 1456, 1420, 1340, 1244, 1080, 889 cm$^{-1}$. The $^{13}$C-NMR spectrum (D$_2$O) showed peaks in the range of 83.6–62.8 ppm.

Example 4

Synthesis of Polyerythritol 30.0 g of meso-erythritol, 0.3 g of sodium hydroxide and 0.05 g of magnesium powder were reacted in a nitrogen gas flow at 220–240° C. under normal pressure (760 mmHg). From 90 minutes after the start of reaction, a total of 45.0 g of meso-erythritol and 0.45 g of sodium hydroxide were added in 12 portions over 5.5 hours. After the addition, reaction was further continued for two hours under the abovesaid conditions. The after-treatment was carried out in the same manner as in Example 2. 60.5 g of a colorless viscous liquid was obtained.

The major peaks of the IR spectrum (KBr) were at 3397, 2930, 2887, 1637, 1458, 1420, 1339, 1241, 1078, 889 cm$^-$. The $^{13}$C-NMR spectrum (D$_2$O) showed peaks in the range of 83.8–62.8 ppm.

Example 5

Synthesis of Polyerythritol 30.0 g of meso-erythritol and 0.3 g of sodium hydroxide were reacted in a nitrogen gas flow at 240° C. under normal pressure. Five hours later (monomer concentration: about 15%), 30.0 g of molten meso-erythritol was added and the reaction was further continued for seven hours under the abovesaid conditions. The after-treatment was carried out in the same manner as in Example 2. 48.0 g of colorless viscous liquid was obtained.

The major peaks of the IR spectrum (KBr) were at 3393, 2930, 2885, 1651, 1458, 1419, 1329, 1249, 1081, 889 cm$^{-1}$. The $^{13}$C-NMR spectrum (D$_2$O) showed peaks in the range of 83.8–62.8 ppm.

Example 6

Synthesis of Erythritol-Glycerol Copolymer 15.0 g of meso-erythritol, 15.0 g of glycerol and 0.3 g of sodium hydroxide were reacted in a nitrogen atmosphere at 240° C. and 200–230 mmHg for two hours. After-treatment was carried out in the same manner as in Example 1. 25.8 g of a colorless viscous liquid was obtained.

When subjected to TOF-MS analysis in the same manner as in Example 1, although the chart was very complicated, besides repeating units of 104 Da originating from meso-erythritol and those of 74 Da originating from glycerol, and peaks of chain copolymers from m/z 196 (condensate of one erythritol molecule and one glycerol molecule) to 1473 (condensate of nine erythritol molecules and seven glycerol molecules), peaks of dehydrates that are smaller by 18 Da than those of chain copolymer were observed. Calculating from the TOF-MS ion strength, the average degree of polymerization was 4.

The major peaks of the IR spectrum (KBr) were at 3369, 2934, 2883, 1652, 1457, 1417, 1330, 1237, 1048, 888 cm$^{-1}$. The $^{13}$C-NMR spectrum (D$_2$O) showed peaks in the range of 83.7–62.5 ppm.

Example 7

Synthesis of Erythritol-Glycerol Copolymer

Except that meso-erythritol was 27.0 g and glycerol was 3.0 g, the reaction and after-treatments were carried out in the same manner as in Example 6. 20.3 g of a colorless viscous liquid (water content 5%) was obtained. The average degree of polymerization of the copolymer obtained was 3.

The major peaks of the IR spectrum (KBr) were at 3392, 2931, 2885, 1651, 1459, 1419, 1331, 1249, 1077, 889 cm$^{-1}$. The $^{13}$C-NMR spectrum (D$_2$O) showed peaks in the range of 83.6–62.7 ppm.

Comparative Example 1

30.0 g of meso-erythritol and 0.3 g of sodium hydroxide were reacted in a nitrogen atmosphere at 175–195° C. and 1 mmHg for eight hours. After-treatment was carried out in the same manner as in Example 1. 29.5 g of a white crystal was obtained.

The major peaks of the IR spectrum of the obtained product were at 3524, 2791, 2956, 2928, 2911, 1417, 1255, 1081, 1054 cm$^{-1}$ and the $^{13}$C-NMR spectrum (D$_2$O) showed only two signals of 74.8 and 65.4 ppm, indicating that the product was unreacted meso-erythritol.

(Evaluation Test 1) [Water-Retention Test]

8 g of the polyerythritols synthesized in Examples 1 and 2 were put in weighing bottles and let to adsorb moisture until equilibriums were reached in a humidity-controlled desiccator (humidity: 75%, 23° C. ). By putting the specimens in a thermo-hygrostat (humidity: 20%, 23° C. ) and measuring their weights, changes in the water content were determined.

For comparison, the same measurement was made for tetraglycerol and decaglycerol. The results are shown in Table 1.

TABLE 1

| Number of days | | 0 | 1 | 2 | 3 | 4 | 5 | 6 |
|---|---|---|---|---|---|---|---|---|
| Polyerythritol | Ex.1 | 25.0 | 18.1 | 15.2 | 13.7 | 12.6 | 11.9 | 11.3 |
| | Ex.2 | 26.4 | 17.6 | 14.3 | 12.7 | 11.6 | 10.8 | 10.2 |
| Tetraglycerol | | 29.2 | 15.2 | 9.4 | 7.3 | 6.2 | 5.4 | 4.8 |
| Decaglycerol | | 24.4 | 13.5 | 9.5 | 7.4 | 6.2 | 5.3 | 4.7 |

<Results>

In all the cases, the water content decreased with time. But the water contents of the polyerythritols of Examples 1 and 2 were higher than in the Comparative Examples. This shows that they had higher water-retention ability.

<<Synthesis of an Aliphatic Acid Ester of a Polyol Polymer>>

Example 8

Synthesis of Polyerythritol Monolaurate

To 24.2 g (0.053 mol) of the polyerythritol (water content: 5%) prepared in Example 1, 11.3 g (0.053 mol) of methyl laurate and 0.113 g of sodium carbonate were added and the mixture was reacted under reduced pressure of 150 mmHg at 180° C. for five hours. After the reaction, the crude product was extracted three times with 50 ml of methyl ethyl ketone. The extract was evaporated to dryness in vaccuo to obtain 26.0 g of a white pasty desired product.

In the IR spectrum (KBr) of the product, besides absorption originating from polyerythritol such as 3350 cm$^{-1}$ (—OH stretching vibration), absorption at 2922 cm$^{-1}$ and 2853 cm$^{-1}$ (—CH$_2$— stretching vibration) which increased due to introduction of aliphatic chains, 1739 cm$^{-1}$ (C=O stretching vibration) and 1077 cm$^{-1}$ (C—O—C stretching vibration) originating from ester bonds were observed. In the $^{13}$C-NMR spectrum (CDCl$_3$), besides peaks of 60–80 ppm originating from polyerythritol, ester carbon and carbon of aliphatic chains were observed at 171–175 ppm and 14–35 ppm, respectively.

Example 9

Polyerythritol Monolaurate

To 28.3 g (0.085 mol) of the polyerythritol (water content: 1%) synthesized in Example 2, 17.1 g (0.085 mol) of lauric acid and 0.2 g of sodium hydroxide were added and the mixture was reacted under normal pressure in a nitrogen gas flow at 190° C. for three hours. After the reaction, ethanol was added, the mixture was decolored with activated carbon, and the ethanol was evaporated from the filtrate to obtain 40.2 g of a light yellow pasty desired product.

In the IR spectrum (KBr) of the product, peaks at 3400 cm$^{-1}$ (—OH stretching vibration), 2925 cm$^{-1}$ and 2855 cm$^{-1}$ (—CH$_2$— stretching vibration), 1738 cm$^{-1}$ (C=O stretching vibration) and 1079 cm$^{-1}$ (C—O—C stretching vibration) were observed. In the $^{13}$C-NMR spectrum (CDCl$_3$), peaks at 60–80 ppm (polyerythritol carbon), 171–175 ppm (ester carbon) and 14–35 ppm (aliphatic chain carbon) were observed.

Example 10

Polyerythritol Monolaurate

To 28.3 g (0.085 mol) of the polyerythritol (water content: 1%) synthesized in Example 2, 17.1 g (0.085 mol) of lauric acid and 0.04 g of sodium hydroxide were added, and the mixture was reacted under normal pressure in a nitrogen gas flow at 220° C. for three hours. After the reaction, the product was dissolved in 2-propanol and then extracted with 10% sodium chloride aqueous solution. The 2-propanol phase was decolored with activated carbon and the 2-propanol was evaporated from the filtrate to obtain 34.5 g of a light yellow pasty desired product.

In the IR spectrum (KBr) of the product, peaks at 3400 cm$^{-1}$ (—OH stretching vibration), 2926 cm$^{-1}$ and 2855 cm$^{-1}$ (—CH$_2$— stretching vibration), 1738 cm$^{-1}$ (C=O stretching vibration), 1112 cm$^{-1}$, 1082 cm$^{-1}$ (C—O—C stretching vibration) were observed. In the $^{13}$C-NMR spectrum (CDCl$_3$), peaks at 61–80 ppm (polyerythritol carbon), 173–175 ppm (ester carbon) and 14–35 ppm (aliphatic chain carbon) were observed.

Example 11

Polyerythritol Monolaurate

To 31.5 g (0.094 mol) of the polyerythritol (water content: 1%) synthesized in Example 2, 18.9 g of lauric acid (0.094 mol) and 0.05 g of sodium hydroxide were added, and the mixture was reacted under normal pressure in a nitrogen gas flow at 220° C. for 3.5 hours. After-treatment was carried out in the same manner as in Example 9 to obtain 47.0 g of a light yellow pasty desired product.

In the IR spectrum (KBr) of the product, peaks at 3390 cm$^{-1}$ (—OH stretching vibration), 2922 cm$^{-1}$ and 2856 cm$^{-1}$ (—CH$_2$— stretching vibration), 1736 cm$^{-1}$ (C=O stretching vibration), 1100 cm$^{-1}$ (C—O—C stretching vibration) were observed. In the $^{13}$C-NMR spectrum (CDCl$_3$), peaks at 61–80 ppm (polyerythritol carbon), 171–175 ppm (ester carbon) and 14–35 ppm (aliphatic chain carbon) were observed.

Example 12

Polyerythritol Monostearate

To 24.7 g (0.075 mol) of the polyerythritol (water content: 1%) prepared in Example 2, 21.2 g (0.075 mol) of stearic acid and 0.4 g of sodium hydroxide were added, and the mixture was reacted under normal pressure (760 mmHg) in a nitrogen gas flow at 220° C. for two hours. After the reaction, the product was treated in the same manner as in Example 9. When the residue was cooled, 42 g of a white flaky desired product was obtained.

In the IR spectrum (KBr) of the product, peaks at 3421 cm$^{-1}$ (—OH stretching vibration), 2922 cm$^{-1}$ and 2856 cm$^{-1}$ (—CH$_2$— stretching vibration), 1736 cm$^{-1}$ (C=O stretching vibration), and 1076 cm$^{-1}$ (C—O—C stretching vibration) were observed. In the $^{13}$C-NMR spectrum (CDCl$_3$), peaks at 60–80 ppm (polyerythritol carbon), 171–175 ppm (ester carbon) and 14–35 ppm (aliphatic chain carbon) were observed.

Example 13

Synthesis of Polyerythritol Tristearate

To 17.7 g (0.039 mol) of the polyerythritol (water content: 5%) synthesized in Example 1, 33.3 g (0.117 mol) of stearic acid and 0.5 g of sodium hydroxide were added, and the mixture was reacted under reduced pressure of 20 mmHg at 200° C. for six hours. After the reaction, toluene was added to the crude product and the mixture was heated at 60° C. When the warm toluene solution was poured into methanol, white solid appeared. The solid was collected and dried to obtain 43 g of a white powdery desired product.

In the IR spectrum (KBr) of the product, peaks at 3391 cm$^{-1}$ (—OH stretching vibration), 2914 cm$^{-1}$ and 2848 cm$^{-1}$ (—CH$_2$— stretching vibration), 1739 cm$^{-1}$ (C=O stretching vibration), 1104 cm$^{-1}$ (C—C—C stretching vibration) were observed. In the $^{13}$C-NMR spectrum (CDCl$_3$), peaks at 60–80 ppm (polyerythritol carbon), 171–175 ppm (ester carbon) and 14–35 ppm (aliphatic chain carbon) were observed.

Example 14

Synthesis of Meso-Erythritol-Glycerol Copolymer Monostearate 11.0 g (0.034 mol) of the meso-erythritol-glycerol copolymer prepared in Example 6 was dissolved in 50 ml of N,N-dimethylformamide in a nitrogen gas flow at 60° C. Into the solution, 20 ml of N,N-dimethylformamide solution containing 10.4 g (0.034 mol) of stearyl chloride was added dropwise over 30 minutes. The mixture was then stirred at 80° C. for 2.5 hours. After the reaction, the crude product obtained by evaporating the solvent in vaccuo was extracted with methyl ethyl ketone. The extract was evaporated to dryness in vaccuo to obtain 12.5 g of a white pasty desired product.

In the IR spectrum (KBr) of the product, besides absorption originating from the polyol copolymer such as at 3385 cm$^{-1}$ (—OH stretching vibration), absorption at 2818 cm$^{-1}$ and 2850 cm$^{-1}$ (—CH$_2$— stretching vibration), 1735 cm$^{-1}$ (C=O stretching vibration) and 1101 cm$^{-1}$ (C—O—C stretching vibration) originating from ester bonds were observed. In the $^{13}$C-NMR spectrum (CDCl$_3$), besides peaks at 60–80 ppm originating from the polyol copolymer, ester carbon at 171–175 ppm and carbon of aliphatic chains at 14–35 ppm were observed.

[Performance Tests]

(Evaluation Test 2) [Water Solubility (Hydrophilicity) Test]

The polyerythritol monostearate prepared in Example 12 was suspended or dissolved in 20 ml of distilled water at 50° C. so that the concentration would be 0.1 wt %, 0.5 wt % and 1.0 wt %. Each of the suspensions or solutions obtained were let to stand at 20° C. for 24 hours. The suspension or solution obtained was transferred into a cuvette and the permeability (%) at 650 nm was measured with a spectrophotometer.

For comparison, similar measurements were made using tetraglycerol monostearate and hexaglycerol monostearate. The results are shown in Table 2.

TABLE 2

| | Permeability (%) | | |
|---|---|---|---|
| concentration (wt %) | 0.1 | 0.5 | 1 |
| Polyerythritol monostearate | 94 | 93 | 83 |
| Tetraglycerol monostearate | 38 | 14 | 8 |
| Hexaglycerol monostearate | 84 | 50 | 32 |

<Results>

It was found that compared to tetraglycerol monostearate and hexaglycerol monostearate, polyerythritol monostearate had higher permeability, suggesting that it had better water solubility, i.e. higher hydrophilicity.

(Evaluation Test 3) [Acid Resistance Test for Aqueous Solutions]

A 0.1 wt % aqueous solution of the polyerythritol monostearate prepared in Example 12 was adjusted to predetermined pH's shown in Table 3 by use of a sodium hydroxide aqueous solution and a hydrochloric acid aqueous solution. They were let to stand at 25° C. for 24 hours. Each of the suspensions or solutions obtained was transferred into a cuvette, and the permeability (%) at 650 nm was measured with a spectrophotometer.

For comparison, similar measurements were made for tetraglycerol monostearate and sucrose monostearate. The results are shown in Table 3.

TABLE 3

| | Permeability (%) | | | | | | | | | |
|---|---|---|---|---|---|---|---|---|---|---|
| pH | 2 | 2.5 | 3 | 3.5 | 3.7 | 4 | 4.5 | 5.5 | 7 | 8 |
| Polyerythritol monostearate | 42 | 41 | 40 | 46 | 86 | 90 | 90 | 91 | 91 | 92 |
| Tetraglycerol monostearate | 18 | 18 | 18 | 32 | 64 | 66 | 67 | 69 | 70 | 71 |
| Sucrose monostearate | 1 | 2 | 3 | 28 | 48 | 86 | 90 | 100 | 100 | 100 |

<Results>

It was found that compared to tetraglycerol monostearate and sucrose monostearate, the permeability in the acid area of polyerythritol monostearate was higher, suggesting that its acid resistance was better.

(Evaluation Test 4) [Salt Resistance Test for Aqueous Solutions]

Sodium chloride was dissolved in a 0.1 wt % aqueous solution of the polyerythritol monostearate obtained in Example 12 so that the concentration of salt would be as shown in Table 4. They were let to stand at 25° C. for 24 hours. Each of the suspensions or solutions obtained was transferred into a cuvette and the permeability (%) at 650 nm was measured with a spectrophotometer.

For comparison, similar measurements were made for tetraglycerol monostearate and sucrose monostearate. The results are shown in Table 4.

TABLE 4

| | Permeability (%) | | | | | | | | |
|---|---|---|---|---|---|---|---|---|---|
| Salt concentration (wt %) | 0 | 0.1 | 0.2 | 0.3 | 0.4 | 0.5 | 0.8 | 1 | 5 |
| Polyerythritol monostearate | 90 | 81 | 76 | 72 | 67 | 61 | 49 | 43 | 32 |
| Tetraglycerol monostearate | 63 | 56 | 47 | 36 | 30 | 27 | 17 | 9 | 7 |
| Sucrose monostearate | 100 | 96 | 71 | 42 | 25 | 6 | 3 | 2 | — |

<Results>

It was found that compared to tetraglycerol monostearate and sucrose monostearate, the permeability of polyerythritol monostearate was higher, suggesting that its salt resistance was better.

(Evaluation Test 5) [Emulsification Test]

The polyerythritol monostearate obtained in Example 12 was added to salt water having sodium chloride concentrations shown in Table 5 to prepare a 5.0 wt % aqueous suspension (solution). 150 parts by weight of soybean oil was added dropwise to 100 parts by weight of the aqueous suspension (solution) agitated with a homomixer at 5000 rpm. After addition was complete, the mixture was further mixed for two minutes at 8000 rpm to prepare emulsified products. The emulsified products were let to stand at room temperature for one to seven days to observe their stability. The results were evaluated under the following standards:

For comparison, similar measurements were made for tetraglycerol monostearate. The results are shown in Table 5.

TABLE 5

| Salt concentration (wt %) | 0 | | 0.5 | | 1 | | 5 | |
|---|---|---|---|---|---|---|---|---|
| Number of days | 1 | 7 | 1 | 7 | 1 | 7 | 1 | 7 |
| Polyerythritol monostearate | o | o | o | o | o | o | o | o |
| Tetraglycerol monostearate | o | o | x | x | x | x | x | x | o: not separated into two layers.
x: separated into two layers.

<Results>

For tetraglycerol monostearate, when the salt concentration was 0.5 wt % or over, all emulsified products separated into two layers. For polyerythritol monostearate, no separation was observed.

(Evaluation Test 6) [Antimicrobial Activity Test]

To nutrient agar (Difco), the polyerythritol monolaurate synthesized in Example 8 was added to concentrations shown in Table 6. The mixture was sterilized. Next, 10 ml of the thus prepared medium was poured into each sterilized petri dish, and cooled to harden. A suspension of *Staphylococcus aureus* IFO12732 incubated at 37° C. in Nutrient broth (Difco) for 24 hours was streaked on agar with a platinum loop and incubated at 37° C. for 24 hours. The degree of inhibition of growth of the bacteria was visually determined.

For comparison, similar measurement was made for tetraglycerol monostearate. The results are shown in Table 6. In Table 6, ○ indicates that no growth of bacteria was observed, Δ indicates that bacteria grew slightly, and X indicates that bacteria grew.

TABLE 6

| concentration (g/l) | 0 | 5 | 10 | 15 |
|---|---|---|---|---|
| Polyerythritol monostearate | x | Δ | ○ | ○ |
| Tetraglycerol monostearate | x | x | x | x |

<Results>

Tetraglycerol monostearate did not show antimicrobial activity whereas polyerythritol monolaurate did.
(Evaluation Test 7) [Heat Stability Test]

For the polyerythritol synthesized in Example 2 and the polyerythritol monostearate synthesized in Example 12, the weights of their residues as a function of temperature were measured with a thermogravimetry (Rigaku Corporation; TAS-200, in air, heating rate: 10° C./min). The results are shown in Table 7.

TABLE 7

| | Weight percent of residue (%) | | | | | | | | | | |
|---|---|---|---|---|---|---|---|---|---|---|---|
| Temperature(° C.) | 50 | 100 | 150 | 200 | 220 | 250 | 300 | 325 | 350 | 380 | 400 |
| Polyerythritol | 100 | 100 | 100 | 99 | 98 | 96 | 88 | 79.5 | 70 | 51 | 31 |
| Polyerythritol monostearate | 100 | 100 | 99.7 | 96.7 | 94 | 88.9 | 77.6 | 70 | 60.4 | 37.2 | 23.3 |

<Results>

For both polyerythritol and polyerythritol monostearate, 95% or more of their original weights remained at 200° C. This shows that they were superior in heat stability.

<<Synthesis of Aliphatic Ether of Polyol Polymer>>

Example 15

Synthesis of Polyerythritol Di(Hydroxytetradecane Ether)

15.0 g (0.035 mol) of the polyerythritol prepared in Example 1 and 0.15 g of sodium hydroxide were dissolved in 20 ml of N,N-dimethylformamide while heating at 150° C. in a dried nitrogen gas flow, and stirred for 30 minutes. 14.8 g (0.070 mol) of 1,2-epoxytetradecane in 50 ml of N,N-dimethylformamide was added to the mixture, which was further stirred for four hours at 105° C. in a dried nitrogen gas flow. After the reaction, N,N-dimetylformamide was evaporated to obtain adcrude product. After dissolving the crude product in 100 ml of hot toluene and cooling the solution to room temperature, unreacted polyerythritol was filtered out. The toluene in the filtrate was evaporated in vaccuo to obtain 28.5 g of a white powdery desired product.

In the IR spectrum (KBr) of the product, besides absorption originating from the polyerythritol such as at 3350 cm$^{-1}$ (—OH stretching vibration), absorption at 2916 cm$^{-1}$ and 2851 cm$^{-1}$ (—CH$_2$— stretching vibration) which increased due to introduction of aliphatic chains, and 1100 cm$^{-1}$ (C—O—C stretching vibration) were observed. In the $^{13}$C-NMR spectrum (CDCl$_3$), besides peaks at 60–80 ppm originating from the polyerythritol, carbon of aliphatic chains were observed at 14–35 ppm.

Example 16

Synthesis of Polyerythritol Monohydroxyoctadecane Ether

Except that 17.9 g (0.041 mol) of the polyerythritol prepared in Example 1 and 10.8 g (0.041 mol) of 1,2-epoxyoctadecane were used, 25.2 g of a white pasty desired product was obtained in the same manner as in Example 15.

In the IR spectrum (KBr) of the product, peaks at 3385 cm$^{-1}$ (—OH stretching vibration), 2979 cm$^{-1}$ and 2936 cm$^{-1}$ (—CH$_2$— stretching vibration), 1739 cm$^{-1}$ (C=O stretching vibration), 1080 cm$^{-1}$ (C—O—C stretching vibration) were observed. In the $^{13}$C-NMR spectrum (CDCl$_3$), peaks at 60–80 ppm (polyerythritol carbon), and 14–35 ppm (aliphatic chain carbon) were observed.

Example 17

Synthesis of Meso-Erythritol Glycerol Copolymer Tri(Hydroxyoctadecane Ether)

Except that 9.2 g (0.029 mol) of the meso-erythritol glycerol copolymer prepared in Example 6 and 24.0 g (0.089 mol) of 1,2-epoxyoctadecane were used, 28.4 g of a white pasty desired product was obtained in the same manner as in Example 15. In the IR spectrum (KBr) of the product, besides absorption originating from the polyol copolymer such as at 3360 cm$^{-1}$ (—OH stretching vibration), absorption of 2918 cm$^{-1}$ and 2850 cm$^{-1}$ (—CH$_2$— stretching vibration) which increased due to introduction of aliphatic chains, and 1079 cm$^{-1}$ (C—O—C stretching vibration) were observed. In the $^{13}$C-NMR spectrum (CDCl$_3$), besides peaks at 60–80 ppm originating from the polyol copolymer, the peaks of the carbon of aliphatic chains were observed at 14–35 ppm.

Example 18

Synthesis of Polyerythritol Monoocatadecane Ether

To a mixture of 15.0 g (0.035 mol) of the polyerythritol prepared in Example 1 and 10.1 g (0.035 mol) 1-chlorooctadecane, 4.2 g (0.05 mol) of a 48% sodium hydroxide aqueous solution was added dropwise over 30 minutes at 100° C., 40 mmHg. Thereafter, 50 ml of N,N-dimethylformamide was added and the mixture was reacted for two hours under the same conditions to obtain a crude product. After dissolving the crude product in 100 ml of hot toluene and cooling the solution to room temperature, unreacted polyerythritol was filtered out. The toluene in the filtrate was evaporated in vaccuo to obtain 15.2 g of a white pasty desired product.

In the IR spectrum (KBr) of the product, besides absorption originating from the polyerythritol such as at 3358 cm$^{-1}$ (—OH stretching vibration), absorption at 2960 cm$^{-1}$ and 2862 cm$^{-1}$ (—CH$_2$— stretching vibration) which increased due to introduction of aliphatic chains, and 1084 cm$^{-1}$ (C—O—C stretching vibration) were observed. In the $^{13}$C-NMR spectrum (CDCl$_3$), besides peaks at 60–80 ppm originating from the polyerythritol, the peaks of the carbon of aliphatic chains were observed at 14–35 ppm.

According to this invention, polyol polymers containing meso-erythritol are obtained. Also, if the monomer is meso-erythritol alone, meso-erythritol polymers are obtained.

Since meso-erythritol has more hydroxy groups by one than glycerol, the polyol polymer obtained and its aliphatic acid ester and aliphatic ether have a greater number of hydrophilic groups than the polyglycerol counterparts. Thus, if they are used for surfactants and/or their raw materials, hydrophilicity of the surfactants obtained improves.

Further, compared with an aliphatic acid ester of polyglycerol, an aliphatic acid ester of the polyol polymer obtained has higher acid and salt resistances, and a higher emulsifying ability.

What is claimed is:

1. A method of preparing a meso-erythritol polymer, comprising the step of polymerizing meso-erythritol at a temperature of 200–250° C. and a pressure of 10–760 mmHg in the presence of a catalyst.

2. The method of preparing a meso-erythritol polymer as claimed in claim 1 wherein meso-erythritol is polymerized at a temperature of 200–250° C. and a pressure of 400–760 mmHg in the presence of a catalyst in a flow of a gas that will not react with either the reactants or the products.

3. The method of preparing a meso-erythritol polymer as claimed in claim 1 wherein meso-erythritol is polymerized at a temperature of 200–250° C. and a pressure of 10–400 mmHg in the presence of a catalyst.

* * * * *